United States Patent [19]

Chandler

[11] Patent Number: 5,470,184
[45] Date of Patent: Nov. 28, 1995

[54] SCREW HOLE PLUG

[76] Inventor: Charles W. Chandler, 245 Albright La., Gallatin, Tenn. 37066

[21] Appl. No.: 181,041

[22] Filed: Jan. 14, 1994

[51] Int. Cl.⁶ .............................. F16B 19/00; A47G 3/00
[52] U.S. Cl. .................... 411/377; 411/509; 411/908; 52/312
[58] Field of Search ..................... 411/371, 373, 411/377, 429, 431, 508, 509, 510, 913

[56] References Cited

U.S. PATENT DOCUMENTS

| 170,190 | 11/1875 | Pratt | 411/510 |
|---|---|---|---|
| 264,776 | 9/1882 | Sharp . | |
| 293,726 | 2/1884 | Fancher . | |
| 3,298,272 | 1/1967 | Henderson . | |
| 3,551,922 | 1/1971 | Watson . | |
| 4,381,633 | 5/1983 | MacLeod | 411/509 |
| 4,394,096 | 7/1983 | Stevens . | |
| 4,577,450 | 3/1986 | Large | 411/377 |
| 4,621,230 | 11/1986 | Crouch | 411/373 |
| 4,869,440 | 9/1989 | Toral | 411/510 |
| 5,112,175 | 5/1992 | Wilkening . | |

FOREIGN PATENT DOCUMENTS

| 1393446 | 2/1964 | France . | |
|---|---|---|---|
| 2239146 | 2/1975 | France | 411/373 |
| 2701833 | 7/1978 | Germany | 411/510 |
| 15153 | of 1896 | United Kingdom | 411/373 |
| 520169 | 4/1940 | United Kingdom | 411/510 |
| 925314 | 5/1963 | United Kingdom . | |

*Primary Examiner*—Flemming Saether

[57] ABSTRACT

A screw hole plug for aesthetically closing a screw hole in a frame element having a counter sunk screw within. The screw hole plug is a molded monolithic deformable plug having a non-planar contoured finished surface that matches the contour of the frame element's exposed surface into which it is inserted by friction abutting the screw head positioned within.

4 Claims, 2 Drawing Sheets

SCREW HOLE PLUG

BACKGROUND OF THE INVENTION

1. Technical Field

This device relates to plug closures that are used to provide a finished matching surface over a screw hole required to conceal a counter sunk screw within.

2. Description of Prior Art

Prior art devices of this type have relied on a variety of different plug configurations all designed to conceal a screw head within a finished article, see for example U.S. Pat. Nos. 264,776, 293,726, 3,298,272, 3,551,922, 4,394,096, 5,112,175 and foreign patents French 1,393,446 and 925,314.

In U.S. Pat. No. 264,776 a plug for counter sinks is disclosed having a cap configuration with a flat top portion and a recessed screw engagement lower portion.

U.S. Pat. No. 293,726 is directed to a contoured solid plug having a planar top surface, a tapered upper portion and a vertically depending lower portion. The plug is disclosed in three forms, all of which are solid with either beveled or straight edges that fit within the opening on top of the screw positioned therein.

U.S. Pat. No. 3,298,272 discloses a decorative cap for screws and bolt heads having a thin wall cap configuration defining a top wall and a continuous annular sidewall that fits over and around the screw or bolt head.

U.S. Pat. No. 3,551,922 has a fastener concealing plate having inclined planar surfaces that extends into and over a bolt seat hinge post opening. The fastener in all forms extends outwardly and beyond the aperture opening it is mounted to and defines a continuous outer cover surface.

U.S. Pat. No. 4,394,096 is directed to an attachment system for plastic liners in which a cap is fitted down over and around a bolt head frictionally engaging over the bolt head and only a portion of the apertured interior surface wall in which the bolt head is recessed.

U.S. Pat. No. 5,112,175 discloses a screw hole plug having a non-planar top surface with a depending annular wall extending therefrom. The plug is inserted into the screw hole over and around the screw head recessed within engaging between the screw head and the screw hole's interior surface wall.

French Pat. 1,393,446 shows a contoured plug having a recessed area within defining an annular sidewall having inturned bottom edges. The plug's top extends over the outer surface of the screw hole opening.

British Patent 925,314 discloses a cap for screw heads having a recessed area defining a annular sidewall with a contoured top extending outwardly over the opening it is inserted in.

SUMMARY OF THE INVENTION

A screw hole plug that is frictionally engaged within a counter sink to provide a closure which is contoured to match the exterior surface of the frame element in which it is inserted. The screw hold plug is a solid monolithic body having oppositely disposed out-turned beveled flanges which extend from a beveled edge defining a flat bottom which when engaged within the counter sink frictionally holds the screw hole plug in place to a depth defined by the engagement of the flat bottom of the plug with the top of a screw head positioned within the counter sink below the surface of the frame element.

DESCRIPTION OF THE PREFERRED EMBODIMENT

Figure 1:
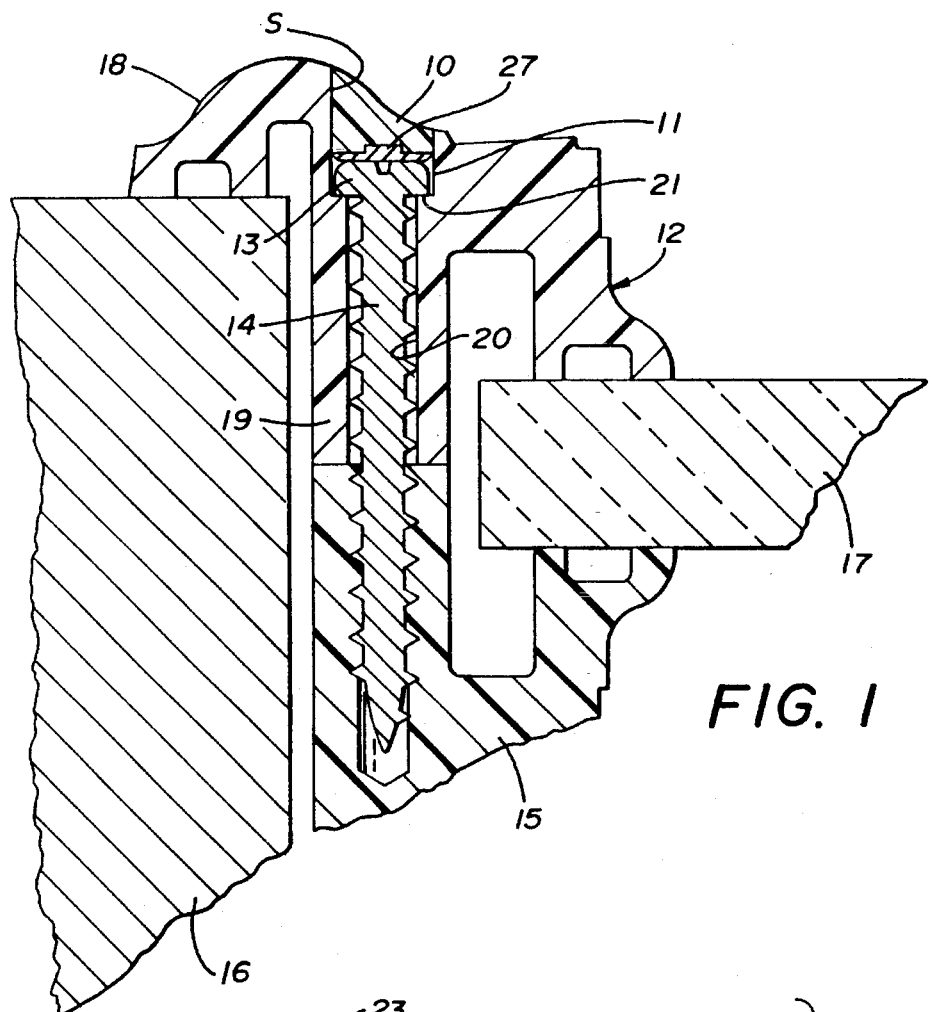
FIG. 1 is a fragmentary partial enlarged cross-sectional view of the screw hole plug positioned within a frame configuration.
Figure 6:
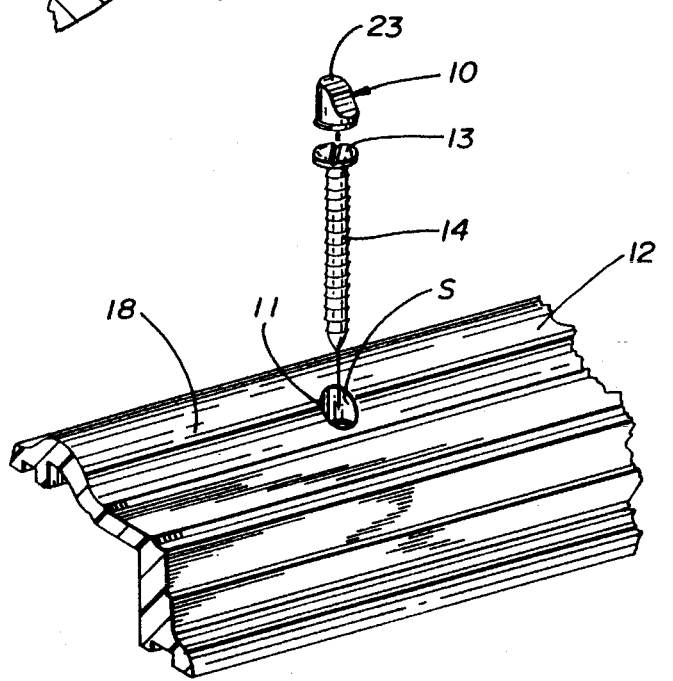
FIG. 6 is an exploded partial perspective view of a frame configuration including the screw hold plug of the invention.
Figure 2:
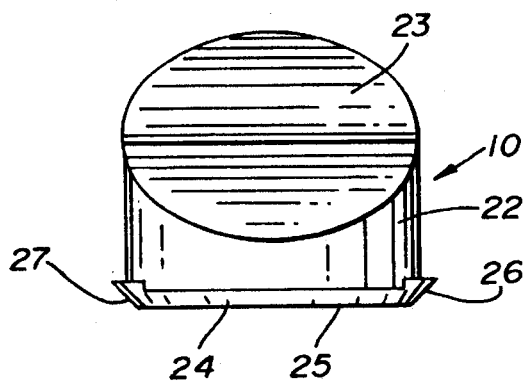
FIG. 2 is a front elevational view of the screw hole plug.

Referring to FIG. 1 of the drawings, a screw hole plug 10 is seen frictionally fitted within a screw counter sink 11 in a molded frame element 12. The screw hole plug 10 is in abutting relationship with a screw head 13 of a screw 14 positioned therein. Such frame elements are found typically on door lights and are well known to those skilled in the art. The molded frame element 12 is positioned in registering alignment with a secondary frame element 15 and it is engageable over a door portion 16 and a glass pane 17 of the door light.

The frame element 12 has a smooth contoured outer surface 18 and a number of spaced screw bosses 19 in which defined an aligned screw hole 20 into which the hereinbefore described screw counter sink 11 is formed. The counter sink 11 typically has a larger diameter than that of the screw hole 20 and provides a recessed area below the frame element's smooth contoured outer surface 18.

The screw 14 extends through the screw hole 20 engaging in threaded relationship the aligned secondary frame element 15 as is clearly illustrated in FIG. 1 of the drawings. The screw head 13 of the screw 14 registers within the screw counter sink 11 engaging same circumferentially at 21 below the smooth contoured outer surface 18 of the molded frame element 12.

The screw hole plug 10, best seen in FIGS. 2–5 of the drawings, is of a one-piece monolithic molded construction having cylindrical side surface 22 and a curvilinear top surface 23 integral therewith. The cylindrical side surface 22 has a beveled lower edge 24 defining a planar bottom screw engagement surface 25. A pair of oppositely disposed arcuate registration flanges 26 and 27 extend from and beyond the beveled lower edge 24. The flanges 26 and 27 are co-planar angular extensions of the beveled edge 24 extending from respective portions of the cylindrical side surface 22, best seen in FIGS. 3 and 4 of the drawings. The cylindrical side surface 22 is of the same exterior dimension as that of the counter sink's 11 interior dimension therefore relying on the relative alignment of the screw hole plug 10 as it is inserted into the counter sink 11 and the wedging engagement of the respective flanges 25 and 26 to frictionally engage and secure the screw hole plug within the counter sink 11.

The screw hole plug 10 is of an overall vertical dimension that corresponds to the known depth of the counter sink 11 less the relative height of the screw head 13. The foregoing screw hole plug 10's dimension is thus calculated so that it's curvilinear top surface 23 will match that of the smooth contoured outer exposed surface 18 of the frame element 12 when inserted therein to the depth limited by abutting engagement of the screw hole plug screw engagement surface 25 with the screw head 13.

Figure 3:
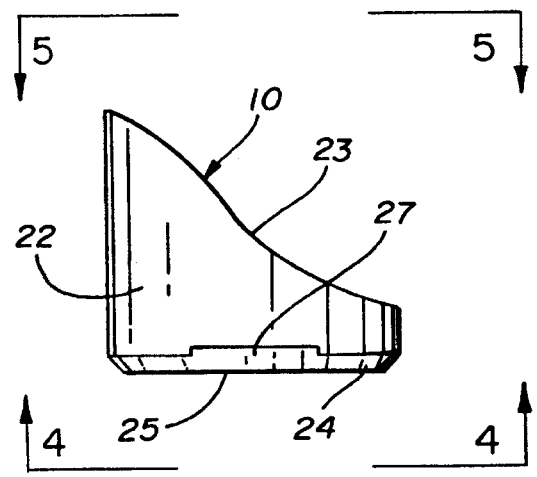
FIG. 3 is a side elevational view of the invention.
Figure 4:
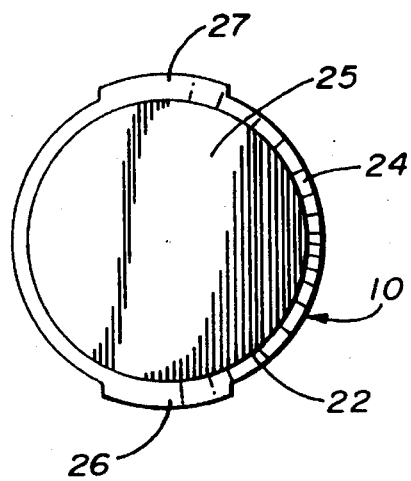
FIG. 4 is a bottom plan view of the invention.
Figure 5:
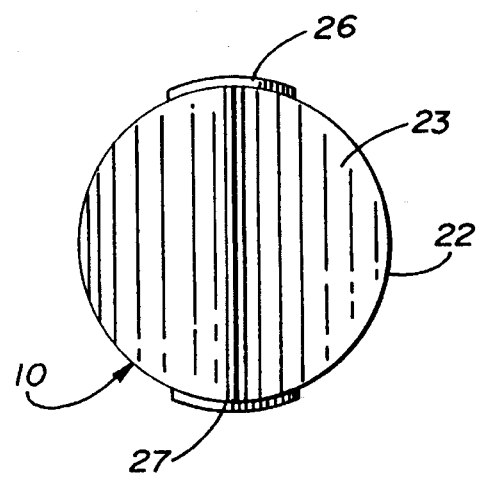
FIG. 5 is a top plan view of the invention.

In the screw hole plug 10 and molded frame element 15 chosen for illustration, the screw hole plug 10's curvilinear top surface 23 is inclined from left to right as seen in FIG. 3 of the drawings. It will be apparent to those skilled in the art that the plug's curvilinear top surface 23 configuration can be modified to conform with the required frame elements smooth contoured surface as required.

In operation, the screw 14 is inserted through the counter sink 11 and into the screw hole 20 formed within the frame element 12 and registerably engaging the secondary frame element 15 as hereinbefore described. The screw 14 tightens down against the counter sink 11's circumferential surface at 21 below the smooth contoured outer surface 18 of the frame element 12. The screw hole plug 10 is rotationally aligned for matching angular orientation with the contoured outer surface 18 of the frame element 12 and inserted into the counter sink 11 frictionally engaging same primarily by the respective flanges 26 and 27 and the close tolerance between the plug's cylindrical side surface 22 and the interior wall surface S of the counter sink 11.

The screw hole plug 10 is inserted until engagement with the upper surface of the screw head 13 occurs. Accordingly, it will be evident that the vertical alignment of the screw hole plug 10 curvilinear top surface 23 with the frame element's smooth contoured surface 18 is achieved by direct engagement of the screw hole plug's screw engaging surface 25 against the screw head 13. The matching aligned curvilinear top surface 23 of the screw hole plug 10 and the smooth contoured outer surface 18 of the molded frame element 12 provides an aesthetically pleasing appearance.

Thus it will be seen that a new and useful screw hole plug has been illustrated and described and it will be apparent to those skilled in the art that various changes and modifications may be made therein without departing from the spirit of the invention.

Therefore I claim:

1. A screw hole plug for use in a counter sink defining a hole within a modified frame element assembly having a smooth contoured exposed surface, a fastener extending through said screw hole having a head located within said counter sink below said smooth contoured exposed surface, said screw hole plug comprised of a single molded monolithic element of resilient deformable material, the screw hole plug having a cylindrical side surface, a curvilinear top surface and a planar bottom surface with a beveled lower edge extending therefrom and intersecting said cylindrical side surface, flanges extending from said beveled lower edge, said flanges are co-planar with said bevel lower edge of said planar bottom surface and extend beyond said cylindrical side surface, said screw hole plug being located within said counter sink whereby said curvilinear top is generally flush with said smooth contoured exposed surface of said frame element.

2. The screw hole plug of claim 1 wherein said flanges are in oppositely disposed spaced relation to one another and are deformable by engagement within said counter sink.

3. An assembly comprising;
   frame element having a smooth contoured top surface, a screw hole extending therethrough, a counter sink within said smooth contoured surface aligned with said screw hole, a screw having a screw head within said screw hole registering with said counter sink below said contoured top surface, a screw hole plug registerably positioned within said counter sink between said screw head and said smooth contoured top surface, said screw hole plug molded of a resilient deformable monolithic material having a curvilinear top surface and a cylindrical side surface extending therefrom, said screw hole plug having a planar bottom surface with a beveled edge, flanges extending from said beveled edge outwardly beyond said cylindrical side surface, said flanges are co-planar with said bevel edge of said planar bottom surface,said screw hole plug frictionally engaged within said counter sink by said flanges and means for orienting said screw hole plug within said counter sink.

4. The screw hole plug of claim 3 wherein said means for orienting said screw hole plug within said counter sink comprises matching the curvilinear top surface of said screw hole plug with said smooth contoured top surface of said frame element by selective rotation of said screw hole plug.

* * * * *